(12) United States Patent
Takimoto et al.

(10) Patent No.: US 9,146,130 B2
(45) Date of Patent: Sep. 29, 2015

(54) IN-VEHICLE INFORMATION DEVICE AND NAVIGATION DEVICE

(75) Inventors: Yasuaki Takimoto, Tokyo (JP);
Masahiro Abukawa, Tokyo (JP);
Takeshi Mitsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/374,301

(22) PCT Filed: Mar. 2, 2012

(86) PCT No.: PCT/JP2012/001466
§ 371 (c)(1),
(2), (4) Date: Jul. 24, 2014

(87) PCT Pub. No.: WO2013/128495
PCT Pub. Date: Sep. 6, 2013

(65) Prior Publication Data
US 2014/0358428 A1   Dec. 4, 2014

(51) Int. Cl.
| G06F 15/16 | (2006.01) |
| G06F 13/38 | (2006.01) |
| G09G 5/08 | (2006.01) |
| G01C 21/36 | (2006.01) |
| G01C 21/26 | (2006.01) |

(52) U.S. Cl.
CPC .......... *G01C 21/3688* (2013.01); *G01C 21/26* (2013.01)

(58) Field of Classification Search
USPC ............ 701/454, 431, 408; 345/156; 710/20; 715/750, 753
See application file for complete search history.

(56) References Cited

U.S. PATENT DOCUMENTS

| 5,649,104 A * | 7/1997 | Carleton et al. ............. 709/204 |
| 5,920,694 A * | 7/1999 | Carleton et al. ............. 709/205 |
| 6,865,458 B1* | 3/2005 | Kim ................................ 701/36 |
| 7,825,896 B2* | 11/2010 | Yoshida ...................... 345/157 |
| 2004/0236825 A1* | 11/2004 | Doi et al. ..................... 709/203 |
| 2007/0094618 A1 | 4/2007 | Yoshida |
| 2008/0076483 A1* | 3/2008 | Shim ......................... 455/569.2 |
| 2011/0177795 A1* | 7/2011 | Kitahara et al. ........... 455/412.1 |

FOREIGN PATENT DOCUMENTS

| JP | 2002-243483 A | 8/2002 |
| JP | 2003-121157 A | 4/2003 |
| JP | 2004-138517 A | 5/2004 |

(Continued)

*Primary Examiner* — Ronnie Mancho
(74) *Attorney, Agent, or Firm* — Birch, Stewart, Kolasch & Birch, LLP (57) ABSTRACT

According to an in-vehicle information device or a navigation device of the invention, each of a plurality of terminals in a vehicle is configured to cause the terminal itself to operate in one of modes including: "an independent operation mode" in which the terminal itself is operated independently; "a participatory cooperative operation mode" in which the terminal directly participates in an operation of the other terminal; and "a transitional cooperative operation mode" in which the terminal takes over information of the other terminal and performs an operation on the information followed by reflecting or not reflecting the information after that operation to the other terminal as information source. Accordingly, it is possible to efficiently transmit or reflect an intention of each of plural occupants in the vehicle to the other occupant by combining independent operations and cooperative operations by the plurality of terminals.

3 Claims, 8 Drawing Sheets (56) References Cited

FOREIGN PATENT DOCUMENTS

| | | |
|---|---|---|
| JP | 2005-265572 A | 9/2005 |
| JP | 2007-114151 A | 5/2007 |
| JP | 2007-218660 A | 8/2007 |
| JP | 2010-126143 A | 6/2010 |
| JP | 2011-112583 A | 6/2011 |

* cited by examiner

IN-VEHICLE INFORMATION DEVICE AND NAVIGATION DEVICE

TECHNICAL FIELD

The present invention relates to an in-vehicle information device and a navigation device each including a plurality of terminals in a vehicle and being operable individually by occupants in respective seats by using the respective terminals.

BACKGROUND ART

According to in-vehicle information devices such as an audio instrument in a vehicle, and navigation devices, in general, operations of the in-vehicle information devices and the navigation devices are each performed by an occupant sitting in the driver's seat or the assistant driver's seat.

However, for example in the case of the navigation device, there are needs by plural occupants such as the driver and the fellow passenger that they individually want to use a function or information of the navigation.

As a device for dealing therewith, in Patent Document 1, for example, there is disclosed a navigation device which is provided with at least two independent input operation units and display units in a vehicle so that functions and information of the device are made usable individually by the plural occupants, for example, the driver can see a road map near around the present location while the assistant driver or the occupant in a rear seat can search a nearby convenience store.

PRIOR ART DOCUMENTS

Patent Documents

Patent Document 1: Japanese Patent Application Laid-open No. 2007-218660

SUMMARY OF THE INVENTION

Problems to be Solved by the Invention

According to the conventional navigation device as shown, for example, in patent Document 1, when an occupant other than in the driver's seat performed an operation related to a normal navigation, a screen image on a display unit for the occupant other than in the driver's seat can be used for selection while being displayed concurrently on a display unit for the driver's seat; however, it is not further allowed for the respective occupants to confirm and consult together as to what route they would be guided along as a result of the selection, and also to reflect a result through such confirmation. Thus, there is a problem that it is unable to efficiently transmit or reflect an intension of each of the plural occupants to the other occupant.

The present invention has been made to solve the problem as described above, and an object thereof is to provide an in-vehicle information device and a navigation device which can efficiently transmit or reflect an intention of each of the plural occupants in a vehicle to the other occupant by combining independent operations and cooperative operations by the plurality of terminals.

Means for Solving the Problems

In order to achieve the above object, the invention is characterized by an in-vehicle information device which includes a plurality of terminals in a vehicle, in which a function of a main unit of the in-vehicle information device is executable from the plurality of terminals, each of the terminals comprising: an input unit operable by an occupant; a communication unit that exchanges information with the other (different) terminal and the main unit of the in-vehicle information device; a cooperation processing unit that performs processing by use of the information exchanged by the communication unit with the other terminal and the main unit of the in-vehicle information device; a mode management unit that causes its terminal to operate in one of modes on the basis of information input through operation of the input unit and a result of the processing performed by the cooperation processing unit, to thereby execute the function of the in-vehicle information device according to the mode, said modes including "an independent operation mode" in which the terminal itself operates independently, "a participatory cooperative operation mode" in which the terminal directly participates in an operation of the other terminal, and "a transitional cooperative operation mode" in which the terminal takes over information of the other terminal and performs an operation on the information followed by reflecting or not reflecting the information after that operation to the other terminal as information source; and a display unit that displays information of the in-vehicle information device resulted from the execution by the mode management unit.

Effect of the Invention

According to the in-vehicle information device and the navigation device, by combining independent operations and cooperative operations by the plurality of terminals, it is possible to efficiently transmit or reflect an intention of each of the plural occupants in the vehicle to the other occupant.

BEST MODE FOR CARRYING OUT THE INVENTION

Hereinafter, in order to describe the present invention in more detail, embodiments for carrying out the invention will be described with reference to the accompanying drawings.
Embodiment 1.

Figure 1:
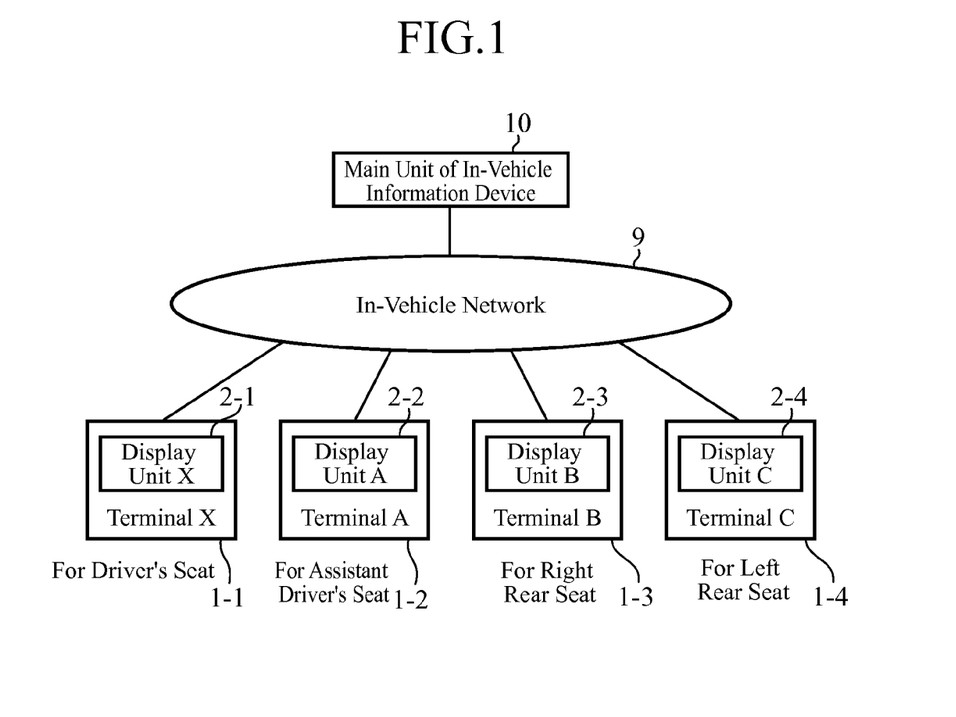
FIG. 1 is a block diagram showing a whole configuration of an in-vehicle information device according to Embodiment 1.

FIG. 1 is a block diagram showing a whole configuration of an in-vehicle information device according to Embodiment 1. The in-vehicle information device includes, in a vehicle, a plurality of terminals, that is, a terminal X(1-1) for driver's seat, a terminal A(1-2) for assistant driver's seat, a terminal B(1-3) for right rear seat, and a terminal C(1-4) for left rear seat, in which a function of a main unit 10 of the in-vehicle information device, such as an in-vehicle audio instrument, is executable from the plurality of terminals by exchanging signals of information etc., through an in-vehicle network 9. Here, a description will be made assuming that the number of the terminals is four; however, the number of the terminals is not limited thereto.

Figure 2:
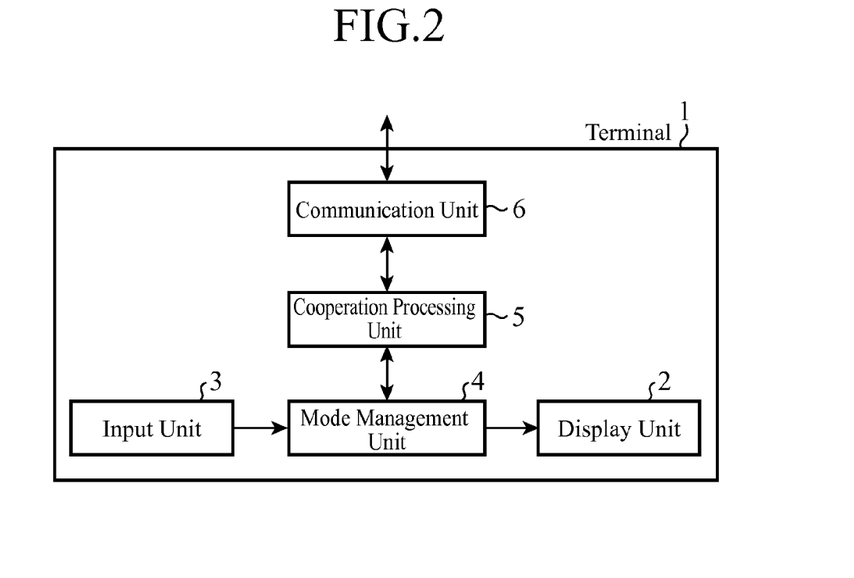
FIG. 2 is block diagram showing a configuration of each terminal in the in-vehicle information device according to Embodiment 1.

FIG. 2 is a block diagram showing a configuration of each terminal 1 (1-1 to 1-4). Each terminal 1 is provided with a display unit 2, an input unit 3 that is unified with the display unit 2 built in the terminal 1, such as a touch panel, a mode management unit 4, a cooperation processing unit 5 and a communication unit 6.

The input unit 3 may be any input unit so far as operable by the occupant, and thus may be that unified with the display unit 2 such as a touch panel, as described above, or an input unit provided with a manipulation unit comprising keys or buttons, etc. The communication unit 6 makes communication with the other (different) terminal or the main unit 10 of the in-vehicle information device through the in-vehicle network 9, and the cooperation processing unit 5 performs cooperative processing by use of information exchanged with the other terminal or the main unit 10 of the in-vehicle information device through the communication unit 6. Meanwhile, the mode management unit 4 serves to executes a function of the in-vehicle information device at its host terminal on the basis of information input through operation of the input unit 3 and a result of the processing performed by the cooperation processing unit 5, and the display unit 2 displays information of the in-vehicle information device resulted from the execution by the mode management unit 4.

Note that each terminal 1 may be an in-vehicle terminal mounted in a vehicle for each of the seats, or may be a mobile terminal that can be brought in a vehicle from the outside (and brought out to the outside of the vehicle).

Then, here is assumed that, when the in-vehicle information device is, for example, an audio instrument, there are the terminal X(1-1), the terminal A(1-2), the terminal B(1-3) and the terminal C(1-4), as shown in FIG. 1, which exchange signals of information etc., with an audio instrument main unit (the main unit 10 of the in-vehicle information device) through the in-vehicle network 9.

In this situation, the mode management unit 4 in each terminal 1 (1-1 to 1-4) causes the each terminal 1 to operate in one of modes including:

"an independent operation mode" in which each terminal is operated independently, so that different songs are played back individually for each terminal 1 (a mode (1) in Embodiment 2 described later);

"a participatory cooperative operation mode" in which, for example, the occupant on the terminal A-side having been asked by the driver to change the audio volume of the terminal X, participates from the terminal A directly in the operation of the terminal X to thereby conduct a substitutional operation to change the volume (a mode (2) in Embodiment 2 described later); and "a transitional cooperative operation mode" in which, for example, the occupant on the terminal A-side having been asked by the driver to change the song that is being audio-reproduced at the terminal X, takes over the information of the terminal X, followed by changing the song reproduced at the terminal X and confirming a song title, i.e. returning (reflecting) the information after taken over and subjected to operation to the terminal X (a mode (3) in Embodiment 2 described later).

As described above, according to Embodiment 1, by combining independent operations and cooperative operations by the plurality of terminals, it is possible to efficiently transmit or reflect an intention of each of the plural occupants in the vehicle to the other occupant.
Embodiment 2.

Figure 3:
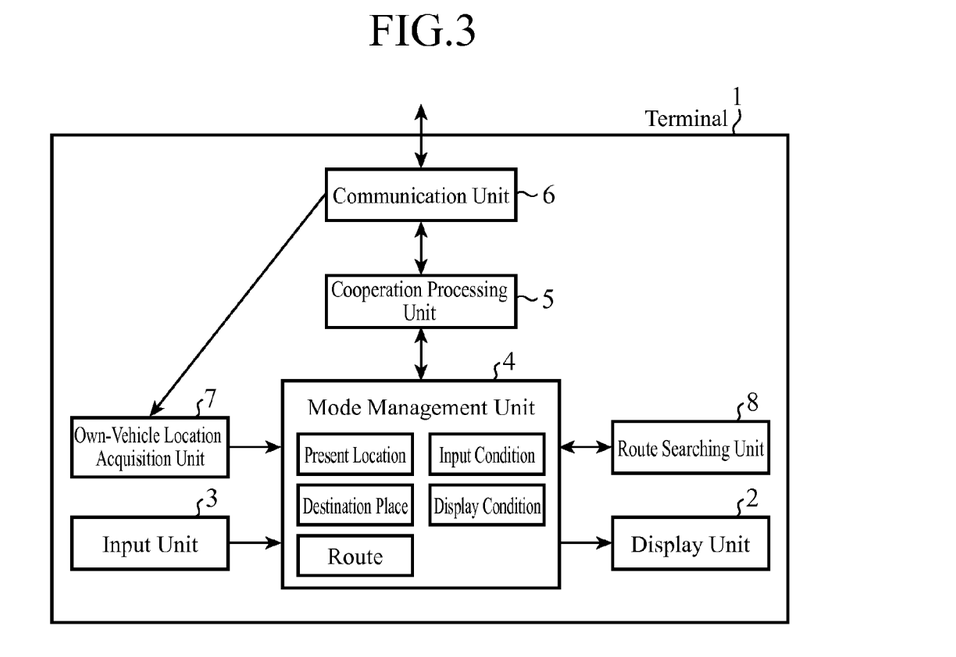
FIG. 3 is block diagram showing a configuration of each terminal in a navigation device according to Embodiment 2.

Although Embodiment 1 is directed to the in-vehicle information device with an in-vehicle audio instrument or the like, in Embodiment 2, a description will be made for a case where the in-vehicle information device is a navigation device, in more detail with specific operation examples. According to Embodiment 2, a block diagram showing a configuration of each terminal 1 (1-1 to 1-4) in the navigation device, is given as in FIG. 3. As compared to the terminal 1 shown in FIG. 2, each terminal 1 in Embodiment 2 further includes an own-vehicle location acquisition unit 7, a route searching unit 8, etc., for the purpose of navigation.

The own-vehicle location acquisition unit 7 serves to acquire information of a vehicle location, and acquires through the communication unit 6, information of an own-vehicle location measured at an own-vehicle location measurement unit (not shown) that utilizes a GPS receiver, a gyroscope or the like provided in a main unit 20 of the navigation device. The route searching unit 8 searches a route for guidance on the basis of the information input through operation of the input unit 3, the information of the vehicle location acquired by the own-vehicle location acquisition unit 7, and map data. Further, the mode management unit 4 serves to execute a function of the navigation device at its terminal 1 on the basis of the information input through operation of the input unit 3, the information of the vehicle location acquired by the own-vehicle location acquisition unit 7, the information of the route searched by the route searching unit 8, and the result of the processing performed by the cooperation processing unit 5, and controls navigation functions of route searching, route guiding, etc., by exchanging information with the route searching unit 8, etc. Furthermore, the communication unit 6 makes communication with the other terminal or the main unit 20 of the navigation device (see, FIG. 4) through the in-vehicle network 9.

In this way, the navigation functions in Embodiment 2 are configured to be separated into common navigation functions, such as due to the own-vehicle location measurement unit provided in the main unit 20 of the navigation device, and independent navigation functions individually given for each terminal 1, so that each terminal 1 can work as an independent navigator.

(1) Independent Operation Mode

Figure 4:
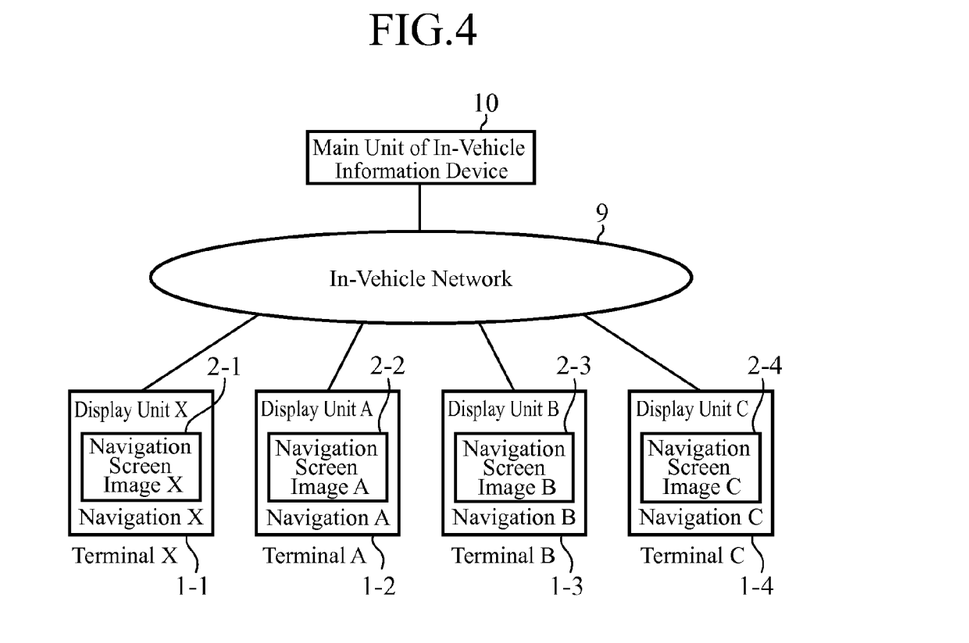
FIG. 4 is a block diagram showing a whole configuration of the navigation device according to Embodiment 2 when its terminals are each in an independent operation mode.

FIG. 4 is a block diagram showing a whole configuration of the navigation device according to Embodiment 2 when its terminals 1 are each in an independent operation mode. The navigation device is configured so that the main unit 20 of the navigation device can exchange signals of information etc., with the terminal X(1-1) for driver's seat, the terminal A(1-2) for assistant driver's seat, the terminal B(1-3) for right rear seat, and the terminal C(1-4) for left rear seat, through the in-vehicle network 9.

On the display unit 2-1 of the terminal X(1-1), a navigation screen image X is displayed. Further, displayed on the display unit A(2-2) of the terminal A(1-2) is a navigation screen image A, on the display unit B(2-3) of the terminal B(1-3) is a navigation screen image B, and on the display unit C(2-4) of the terminal C(1-4) is a navigation screen image C, respectively. Thus, there is shown a state where a navigation operation is performed in each terminal 1 in an independent state (in an independent mode).

(2) Participatory Cooperative Operation Mode

Figure 5:
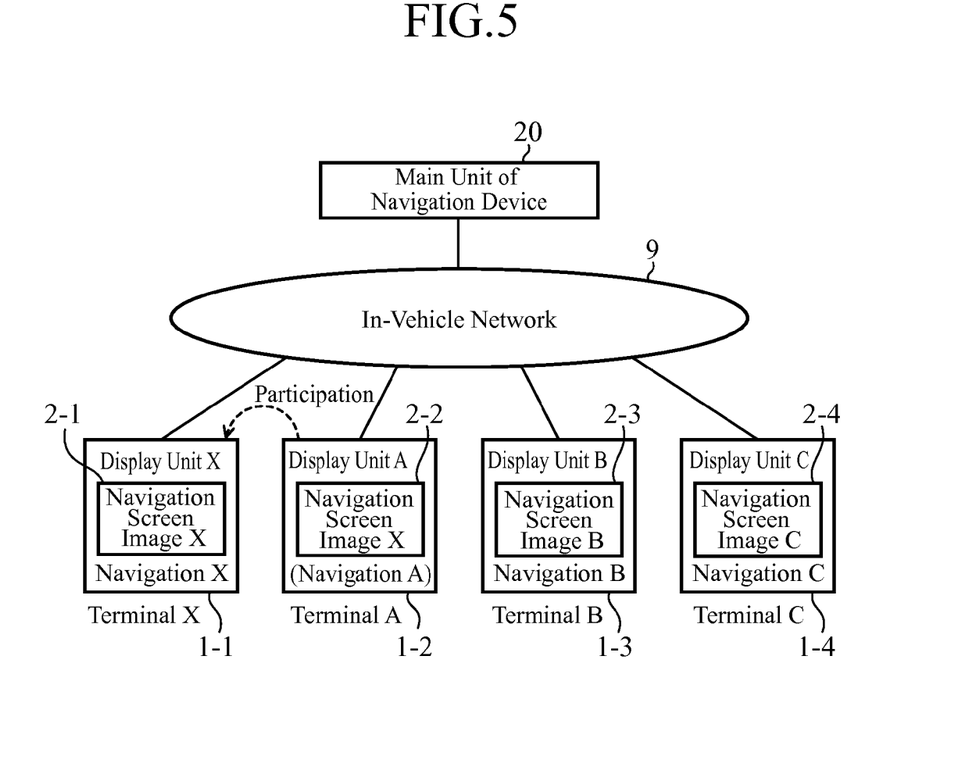
FIG. 5 is a block diagram showing a whole configuration of the navigation device according to Embodiment 2 when a terminal A is in a cooperative operation mode because of participating in a navigation X of a terminal X.

FIG. 5 is a block diagram showing a whole configuration of the navigation device according to Embodiment 2 when the terminal A(1-2) is in a cooperative operation mode because of participating in the navigation of the terminal X(1-1).

This mode is started, for example, by a selection of "Start Operation For Other (Different) Navigator" as a trigger from a menu at the terminal A(1-2).

Figure 6:
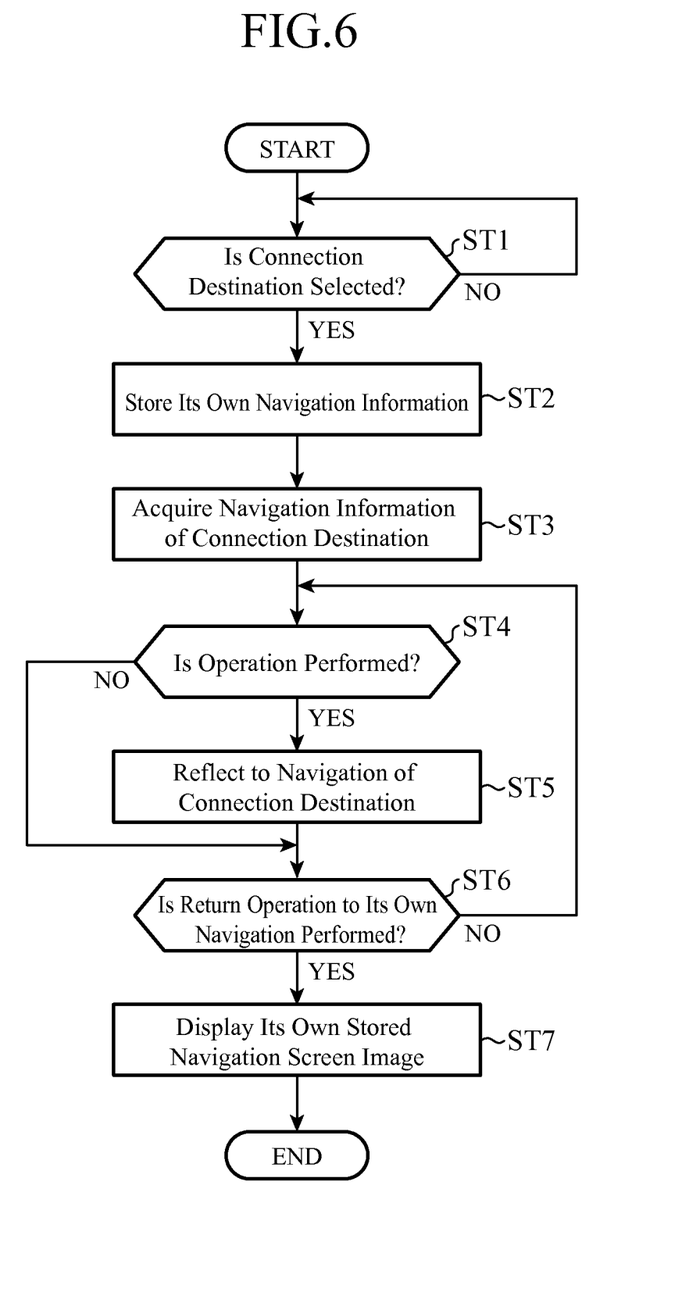
FIG. 6 is a flowchart showing an operation in the terminal that starts a participatory cooperative operation in the navigation device according to Embodiment 2.

FIG. 6 is a flowchart showing an operation in the terminal A(1-2) that starts a participatory cooperative operation mode.

First, in the terminal A, after the selection of "Start Operation For Other Navigator", when the terminal X is selected as a connection destination that signifies which terminal the navigation operation is to be started in (Step ST1, in the case of "YES"), information of the navigation A in the terminal A itself is temporarily stored in its internal buffer memory (Step ST2). Then, information of the navigation X is acquired from the terminal X i.e. the connection destination, so that a navigation screen image X is displayed (Step ST3).

Figure 7:
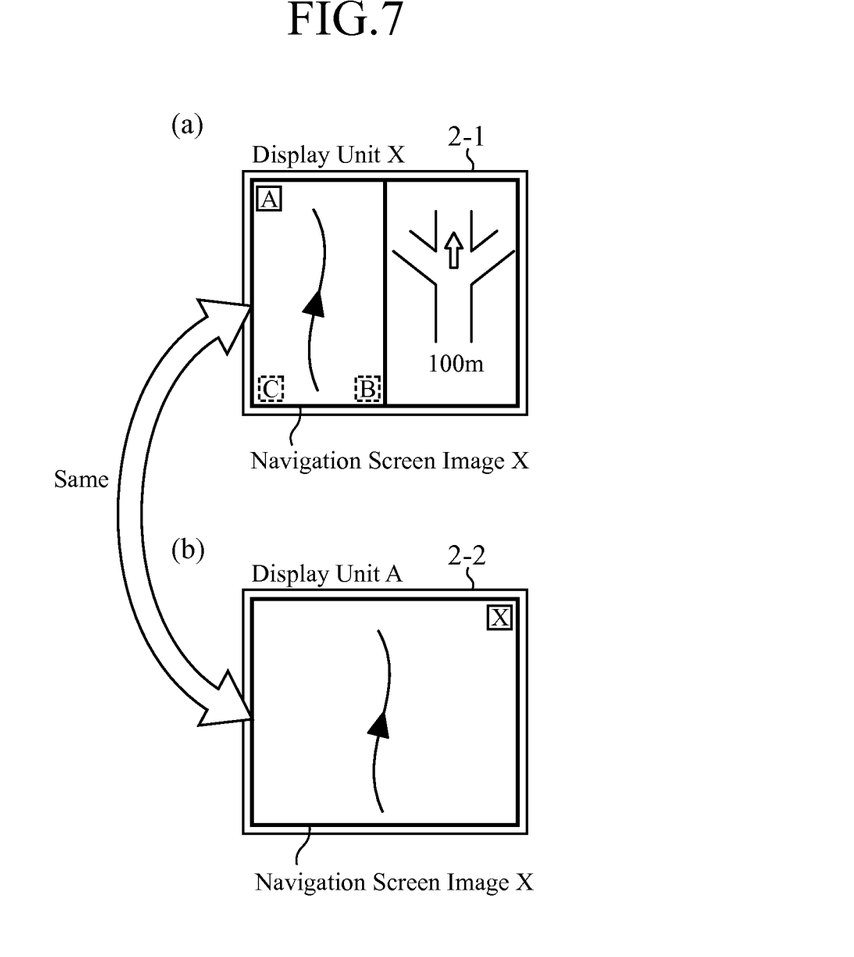
FIG. 7 is a diagram showing states where the terminal A acquires and displays a navigation screen image X of the terminal X.

FIG. 7 is a diagram showing states where, in Step ST3, the terminal A acquires the information of the navigation X of the terminal X and displays the navigation screen image X. Shown at FIG. 7(a) is a state where the navigation screen image X is displayed on the left half of the display unit X(2-1) in the terminal X and a driver-oriented screen image is displayed on the right half thereof. Shown at FIG. 7(b) is a state where the navigation screen image X is displayed also on the display unit A(2-2) in the terminal A participating in the navigation of the terminal X.

In these states, when a navigation operation is made on the navigation screen image X displayed on the display unit A(2-2) of the terminal A (Step ST4, in the case of "YES"), the processing similar to in the case of directly operating the terminal X is carried out, and the operation is also reflected concurrently to the navigation of the terminal X, so that the navigation screen image X displayed on the left half of the display unit X(2-1) of the terminal X works similarly to the navigation screen image X displayed on the display unit A(2-2) of the terminal A (Step ST5).

The processing in Steps ST4 and ST5 is repeated (Step ST6, in the case of "NO") until in the terminal A an operation for retuning to its own navigation operation is performed.

Then, in the terminal A, when the operation for retuning to its own navigation operation is performed (Step ST6, in the case of "YES"), the information of the navigation A of the terminal A itself having been temporarily stored in the internal buffer memory in Step ST2 is restored, so that the navigation screen image A is displayed (Step ST7) and operation is returned to that of the navigation A of the terminal A itself.

Here, although the information of the navigation A of the terminal A itself is temporarily saved to be suspended at the time of participation in the operation of the other terminal X, the information of the navigation A itself may be held in the background. In any case, when returning from the navigation operation of the terminal X, the original operation condition (navigation A) of the terminal A can be easily restored.

Further, in FIG. 7(a), since the display unit X(2-1) is given for the terminal X(1-1) for the driver's seat, even in the case, for example, where a display of a route guidance part is kept on the right half as a driver-oriented screen image and a fellow passenger makes a setting on behalf of and under direction of the driver, the driver can know navigation information during the time of changing (route guidance at that time). Thus, it is possible to avoid confusion of the driver.

Note that although the driver-oriented screen image has been described assuming that it is not displayed on the display unit A(2-2) of the terminal A (see, FIG. 7(b)), the driver-oriented screen image may be made selectable to be displayed even at the other terminal, or not.

Further, although the driver-oriented screen image has been described here assuming that it is displayed on the display unit X(2-1) of terminal X(1-1) for the driver's seat, the driver-oriented screen image may be configured to be not displayed even on the display unit X of the terminal X. In this case, as similar to that in FIG. 7(b), the navigation screen image X is also displayed wholly on the display unit X(2-1) shown in FIG. 7(a).

Here, although the description has been made citing the case as an example where the terminal A solely participates directly in the navigation X of the terminal X, it is also allowable that a plurality of terminals operate for a single terminal.

(3) Transitional Cooperative Operation Mode

Next, a description will be made not for a case where the terminal A participates in the navigation X of the terminal X, but for a case where the terminal A takes over information of the navigation X of the terminal X and independently performs an operation thereon followed by reflecting or not reflecting it to the terminal X.

Figure 8:
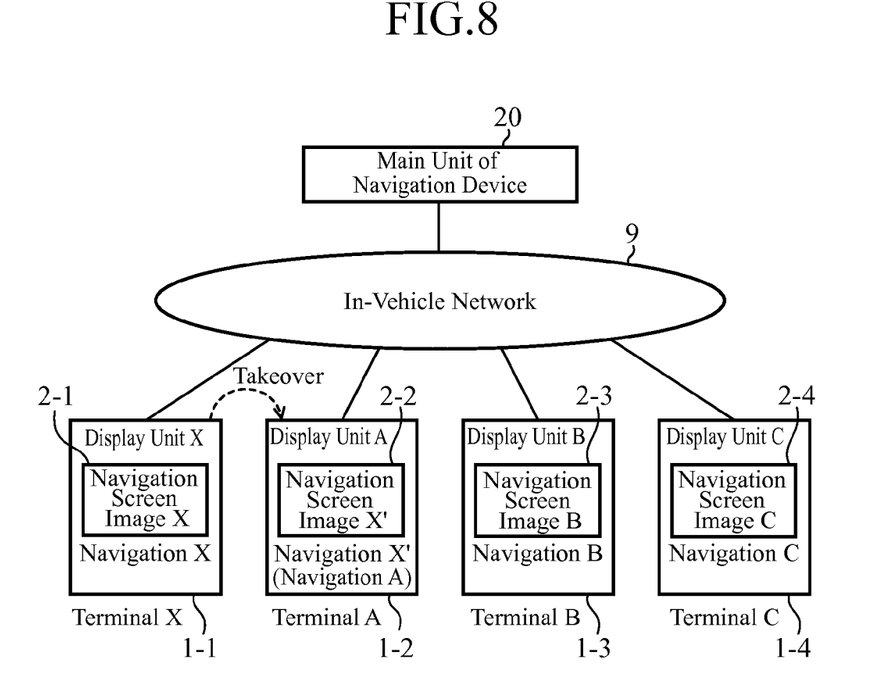
FIG. 8 is a block diagram showing a whole configuration of the navigation device according to Embodiment 2 when the terminal A is in a cooperative operation mode because of taking over a navigation X of the terminal X.

FIG. 8 is a block diagram showing a whole configuration of the navigation device according to Embodiment 2 when the terminal A(1-2) is in another cooperative operation mode because of taking over the navigation X of the terminal X(1-1).

This mode is started, for example, by a selection of "Acquire Other Navigator Condition" as a trigger from the menu at the terminal A(1-2).

Figure 9:
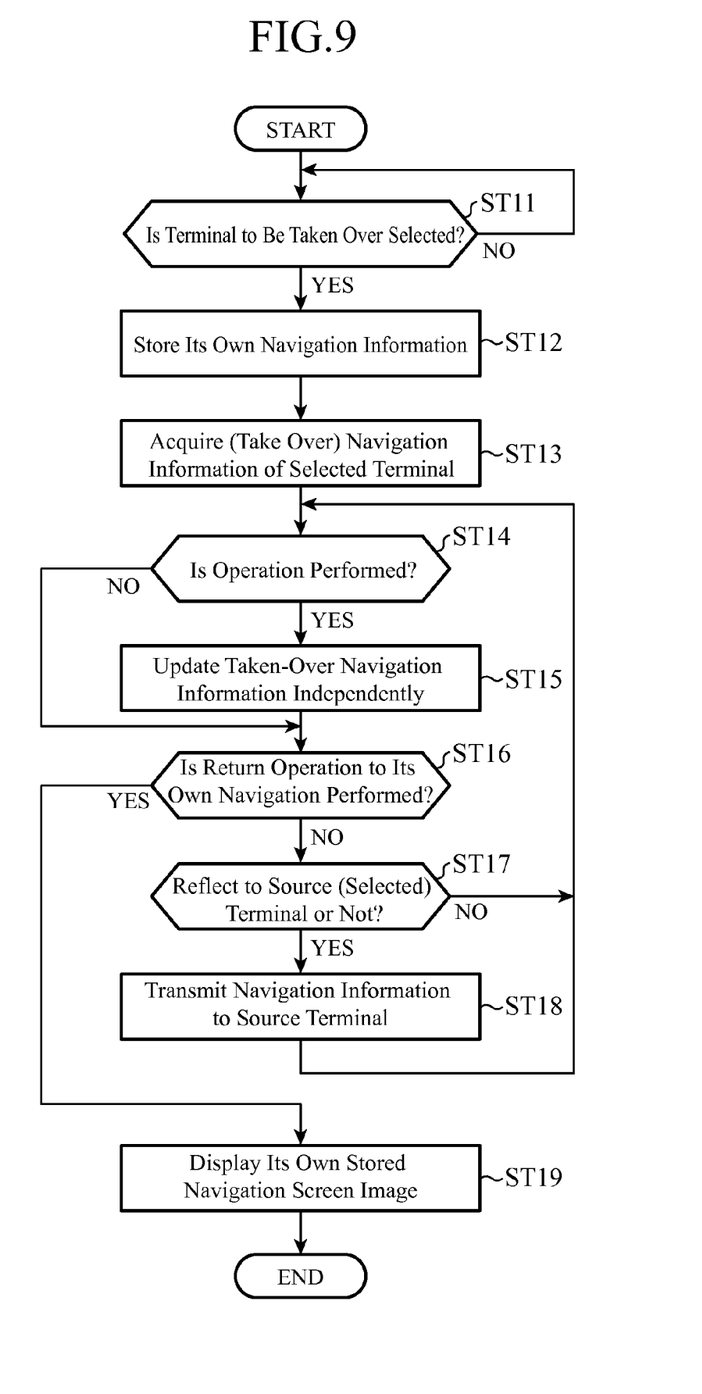
FIG. 9 is a flowchart showing an operation in the terminal that starts a transitional cooperative operation in the navigation device according to Embodiment 2.

FIG. 9 is a flowchart showing an operation in the terminal A(1-2) that starts a transitional cooperative operation mode.

First, in the terminal A, after the selection of "Acquire Other Navigator Condition", when the terminal X is selected with respect to from which terminal the navigation is to be taken over to start operation, that is, it is selected as a terminal subject to takeover (Step ST11, in the case of "YES"), information of the navigation A in the terminal A itself is temporarily stored in the internal buffer memory (Step ST12). Then, information of the navigation X (destination place, transit places, route, map displaying condition, etc.) of the terminal X selected in Step ST11 is acquired, so that the navigation screen image X is displayed on the display unit A(2-2) of the terminal A (Step ST13).

At this time, like the screen image example shown in FIG. 7, a screen image that is the same as the navigation screen image X of the terminal X is displayed on the display unit A(2-2) of the terminal A. Here, the information of the navigation X and the navigation screen image X acquired by the terminal A from the terminal X are referred to as a navigation X' and a navigation screen image X', respectively. The navigation X' is independent of the navigation X.

In this state, when a navigation operation is made on the navigation screen image X' displayed on the display unit A(2-2) of the terminal A (Step ST14, in the case of "YES"), this operation is reflected only to the navigation X' at the terminal A, and thus the navigation screen image X displayed on the display unit X(2-1) of the terminal X remains as it is according to the navigation X of the terminal X. That is, the respective navigation information in the terminal X and the terminal A are independent of each other, so that the navigation X' and the navigation screen image X' which have been taken over from the navigation X of the terminal X, are updated in the terminal A independently (Step ST15).

Here, in terminal A, after operating and updating in many ways the navigation X' taken over from the terminal X, there is a case where the operator determines not to reflect it to the terminal X thus making no change therein and to return to the original state, because, for example, the operator refrains from reflecting the information to the terminal X, it is found that reflecting the information brings not so good result, or the operator changes his/her mind. In such a case, in the terminal A, when the operation for retuning to its own navigation operation is performed (Step ST16, in the case of "YES"), the navigation screen image A of the terminal A itself having been temporarily stored in the internal buffer memory in Step ST12 is displayed (Step ST19) while reflecting no information to the terminal X, and operation is returned to that of the navigation A of the terminal A itself.

Also in here, although the information of the navigation A of the terminal A itself is temporarily saved to be suspended at the time of taking over the operation of the other terminal X, the navigation A may be held in the background. In any case, when returning from the operation of the navigation X', the original operation condition (navigation A) of the terminal A can be easily restored.

On the other hand, when the operation for retuning to its own navigation operation is not performed (Step ST16, in the case of "NO"), the processing in Steps ST14 and ST15 is repeated (Step ST17, in the case of "NO") until in the terminal A an operation for reflecting the taken-over and updated navigation X' to the original terminal X is performed.

Then, when the operation for reflecting the taken-over and updated navigation X' to the original terminal X is performed (Step ST17, in the case of "YES"), the information of the navigation X' updated by the terminal A is transmitted to the original terminal X (Step ST18) and is reflected to the terminal X, so that the navigation screen image X' is displayed there.

Finally, in the terminal A, when the operation for retuning to its own navigation operation is performed (Step ST16, in the case of "YES"), the navigation screen image A of the terminal A itself having been temporarily stored in the internal buffer memory in Step ST12 is displayed (Step ST19), and operation is returned to that of the navigation A of the terminal A itself.

In the case of this transitional cooperative operation, with respect to the terminal A which has taken over the navigation X of the terminal X and is performing operation of the navigation X', the operation before being reflected to the terminal X is allowed to be confirmed by the driver who is the user of the terminal X, as well as the occupants who use the other terminals B, C. That is, when each of the other occupants starts, at their respective terminals, an operation for participating to the navigation X' of the terminal A at that time or for taking over the navigation X', the occupant can confirm the navigation X' operated by the user of the terminal A, by displaying the navigation screen image X' at each of their terminals. As a result, the reflection to the terminal X is allowed with approval of the driver or the other occupant, and thus it is possible to prevent that an operation from a misunderstanding is reflected as it is to the navigation, or the navigation changes to that which is not desired by the driver.

Further, in the case of this transitional cooperative operation, as different from the participatory cooperative operation, since the operation can be performed without showing its state during operation to the terminal X, there is also such a merit that no confusion is caused to the driver who is the user of the terminal X. Note that the reflection of the navigation to the terminal X is not required to be done after the completion of all operations, and may be done intermittently according to an instruction of the operator of the terminal A.

Here, although a description has been made citing a case as an example where the terminal A solely takes over the navigation X of the terminal X, it is also allowable that a plurality of terminals take over and operate the navigation of a single terminal. For example, it is allowed that the respective other terminals A, B, C take over the navigation X of the terminal X concurrently, and then, the respective users, after independently updated the navigation X', determine from which terminal the updated version of the navigation X' is to be reflected to the terminal X, by displaying navigation screen images of the other terminals at each of the terminals and by confirming the images and consulting with each other.

In this way, each terminal 1 is configured to select one of the modes of (1) "the independent operation mode" in which the terminal itself operates independently, (2) "the participatory cooperative operation mode" in which the terminal directly participates in the operation of the other terminal, and (3) "the transitional cooperative operation mode" in which the terminal takes over information of the other terminal and performs an operation on the information followed by reflecting or not reflecting the information after that operation to the other terminal as information source. This makes it possible to efficiently transmit or reflect an intention of each of the plural occupants in the vehicle to the other occupant, by combining independent operations and cooperative operations by the plurality of terminals.

That is, information of the navigation can be reflected to the terminal X for the driver's seat with consensus of all the members.

Here, a description will be made specifically for a method of controlling a destination place, transit places and the like of the navigation when a route searched by the route searching unit 8 is to be changed, in order to efficiently deal with a case of receiving operations from a plurality of the terminals.

For the case of the aforementioned transitional cooperative operation mode (3), there are provided an operation method in which, at the time a destination place, a transit place and a path are to be reflected, they are registered as another route, and an operation method in which, at that time, each of the destination place and the transit place is registered as a transit place on an already-existing route.

Figure 10:
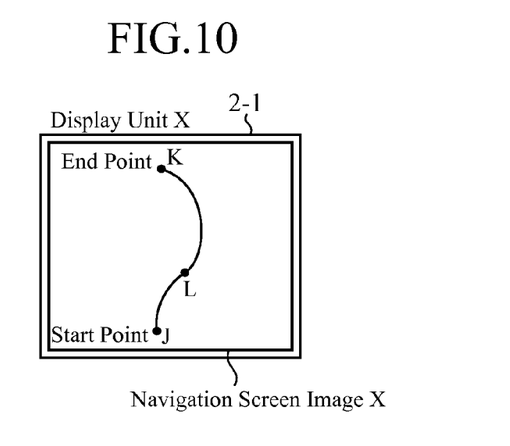
FIG. 10 is a diagram showing a state where a route (reference route) having been set in a navigation X at the terminal X is displayed as a navigation screen image X on a display unit X.

FIG. 10 is a diagram showing a state where a route (reference route) having been set in the navigation X in the terminal X(1-1) is displayed as a navigation screen image X on the display unit X(2-1). The starting point of the reference route is indicated by J, the end point i.e. a destination place is indicated by K, and the preset transit place is indicated by L.

In this state, here is assumed a case where the terminal A(1-2) takes over the navigation X and adds thereto a destination place and/or a transit place. Each of the destination place and the transit place can be designated whether it is to be visited necessarily or not yet determined to be visited; however, it is not always required to designate all of these individually. Here, the destination place and the transit places (J, K, L) on the route having been originally set, are designated to be visited necessarily, and a transit place or a designation place on a route to be added thereafter, will be designated individually.

Figure 11:
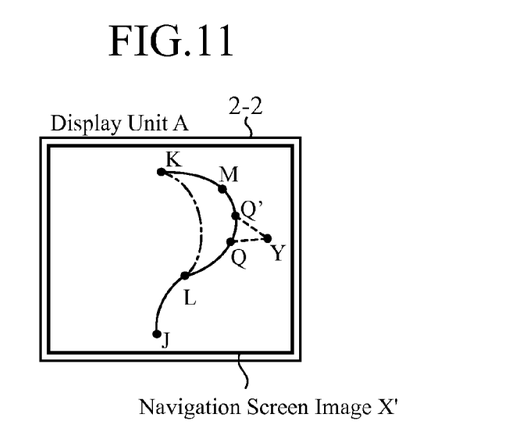
FIG. 11 is a diagram showing a navigation screen image X' when the terminal A took over a navigation X from the terminal X and added thereto a place M and a place Y as transit places.

FIG. 11 is a diagram showing a navigation screen image X' when the terminal A(1-2) took over the navigation X from the terminal X and added thereto a place M and a place Y as transit places. On this occasion, the transit place M is designated to be visited necessarily, and the transit place Y is designated as not yet determined to be visited. Note that a dashed-dotted line in the figure indicates the original route (reference route) shown in FIG. 10. Because of designating the transit place M to be visited necessarily, a new route is searched by the route searching unit 8, so that there is indicated the new route that starts from the start point J and reaches the end point K i.e. the destination place, through the places L and M. Then, for example, by displaying the navigation screen image X' of the terminal A even at the other terminal, it becomes possible to make consultation with the other occupant to thereby determine whether or not to visit the place Y not yet designated to be visited.

On this occasion, while making communication with the route searching unit 8, the mode management unit 4 of the terminal A(1-2) makes a route control so that an extension in time can be achieved until as late as possible for judging whether or not to visit the place Y not yet determined to be visited.

Here, such a point that is on the route JK from the start point J to the end point K and that minimizes the distance to the place Y is searched, and its place is defined as a point Q. When searching a place to be visited necessarily on the route JK and around the point Q (the place may be coincided with the starting point or the end point), the places L and M are found in this example. At this time, by limiting the route to be considered to that between L and M, a route LQYM is newly searched by the route searching unit 8 as a route for visiting Y. Assuming that the route LQM is to be passed when Y is not to be visited, and the route LQYM is to be passed when Y is to be visited, it suffices that the necessity or non-necessity of visiting Y is determined within the common route LQ, that is, until reaching the point Q, so that the judgment on the necessity or non-necessity of visiting Y can be delayed.

In this way, while making communication with the route searching unit 8, the mode management unit 4 makes a route control until reaching the point Q so that an extension in time can be achieved for judging whether or not to determine as a route for guidance, the route for visiting the place Y (the route newly searched by the route searching unit 8).

When other points are further found that are on the route LM and that are each located relative to the place Y through a path not so longer than the route QY (for example, points each satisfying that the difference between the distance from that point to the place Y and the distance QY falls within a predetermined value), it is allowed to determine, among these points, the point that is closest to the transit place M as a point Q', and to use the point Q' instead of the point Q. In this case, by limiting the route to be considered to that between L and M, a route LQ'YM is newly searched by the route searching unit 8 as a route for visiting Y. Assuming that the route LQ'M is to be passed when Y is not to be visited, and the route LQ'YM is to be passed when Y is to be visited, it suffices that the necessity or non-necessity of visiting Y is determined until reaching the point Q', so that the judgment on the necessity or non-necessity of visiting Y can be further delayed.

That is, while making communication with the route searching unit 8, the mode management unit 4 finds out the point Q as a place for allowing the judgment to be delayed until the very latest moment, and then makes a route control until reaching the point Q' so that an extension in time can be achieved for judging whether or not to determine as a new route, the route for visiting the place Y.

Then, in the case of using the point Q, when approaching to the branch point Q, or in the case of using the point Q', when approaching to the branch point Q', a notification about that approaching to the branch point is made so as to prompt the operator to select the necessity or non-necessity of visiting the place Y or to select a route. At this time, when the occupant of the other terminal participates to the navigation X' of the terminal A, or when the occupant of the other terminal takes over the navigation X' of the terminal A and similarly displays the navigation screen image X' even at the other terminal, it is allowed for the occupants to finally determine whether to visit the place Y or not, by consulting with each other.

Note that, although not shown here, the route without visiting the place Y (the actual line in FIG. 11) and the route visiting the place Y (the route JLQYMK indicated by the actual line in FIG. 12, although not shown clearly in FIG. 11) may be displayed, for example, in switchable manner by a selection, in overlapping manner with different colors, and so on.

Figure 12:
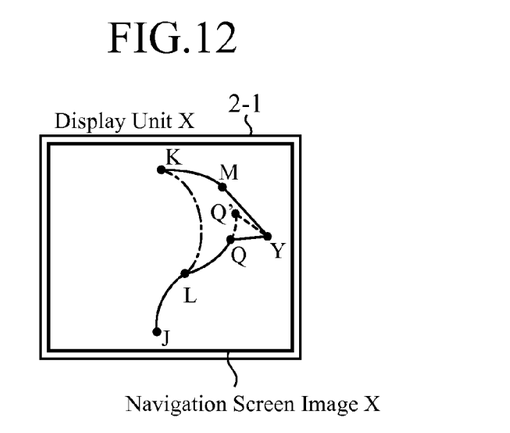
FIG. 12 is a diagram showing a navigation screen image X displayed on the display unit X in the terminal X as a result of transmitting and reflecting a navigation X' at the terminal A to the terminal X.

As a result, for example, before approaching to the branch point Q, when it is determined to also visit the place Y in the terminal A and information of its navigation X' is transmitted and reflected to the terminal X, a navigation screen image X as shown in FIG. 12 is displayed on the display unit X(2-1) in the terminal X. Note that the broken line in FIG. 12 represents the route to be displayed when, after passing the branch point Q but before approaching the branch point Q', it is determined to also visit the place Y.

In this way, by combining independent operations and cooperative operations by the plurality of terminals, it is possible to efficiently transmit or reflect an intention of each of the plural occupants in the vehicle to the other occupant.

Note that, the navigation device according to Embodiment 2 is also provided with a function that can reset the device to the original state, when the driver i.e. the user of the terminal X feels dislike of the result in the case where the navigation screen image X of the driver's terminal X itself is operated by the other terminal because of the other terminal participating in the navigation X of the driver's terminal X itself, or in the case where the navigation X' updated by the other terminal after having taken over the navigation X, is reflected to the driver's navigation X itself; or when the driver wants to reset the device to the original state (a state of the navigation X at the time it was used by the driver itself). Further, the device may be configured so that it can beforehand set inhibition of the operation/the reflection, permission thereof, or each-time inquiry thereon.

As described above, according to Embodiment 2, like Embodiment 1, by combining independent operations and cooperative operations by the plurality of terminals, it is possible to efficiently transmit or reflect an intention of each of the plural occupants in the vehicle to the other occupant.

It should be noted that unlimited combination of the respective embodiments, modification of any configuration element in the embodiments and omission of any configuration element in the embodiments may be made in the present invention without departing from the scope of the invention.

Industrial Applicability

The invention can be applied to an in-vehicle information device and a navigation device which are operable with a plurality of terminals.

DESCRIPTION OF REFERENCE NUMERALS AND SIGNS

1: terminal, 1-1, terminal X, 1-2, terminal A, 1-3: terminal B, 1-4: terminal C, 2: display unit, 2-1: display unit X, 2-2: display unit A, 2-3: display unit B, 2-4: display unit C, 3: input unit, 4: mode management unit, 5: cooperation processing unit, 6: communication unit, 7: own-vehicle location acquisition unit, 8: route searching unit, 9: in-vehicle network, 10: main unit of in-vehicle information device, 20: main unit of navigation device.

The invention claimed is:

1. An in-vehicle information device including a plurality of terminals in a vehicle, in which a function of a main unit of the in-vehicle information device is executable from the plurality of terminals, each of the terminals comprising:

an input unit operable by an occupant;

a communication unit that exchanges information with the other terminal and the main unit of the in-vehicle information device;

a cooperation processing unit that performs processing by use of the information exchanged by the communication unit with the other terminal and the main unit of the in-vehicle information device;

a mode management unit that causes its terminal to operate in one of modes on the basis of information input through operation of the input unit and a result of the processing performed by the cooperation processing unit, to thereby execute the function of the in-vehicle information device according to the mode, said modes including "an independent operation mode" in which the terminal itself operates independently, "a participatory cooperative operation mode" in which the terminal directly participates in an operation of the other terminal, and "a transitional cooperative operation mode" in which the terminal takes over information of the other terminal and performs an operation on the information followed by reflecting or not reflecting the information after that operation to the other terminal as information source; and a display unit that displays information of the in-vehicle information device resulted from the execution by the mode management unit.

2. A navigation device including a plurality of terminals in a vehicle, in which a function of a main unit of the navigation device is executable from the plurality of terminals, each of the terminals comprising:

an input unit operable by an occupant;

an own-vehicle location acquisition unit that acquires a location of the vehicle;

a route searching unit that searches a route for guidance on the basis of information input through operation of the input unit, information of the location of the vehicle acquired by the own-vehicle location acquisition unit, and map data;

a communication unit that exchanges information with the other terminal and the main unit of the navigation device;

a cooperation processing unit that performs processing by use of the information exchanged by the communication unit with the other terminal and the main unit of the navigation device;

a mode management unit that causes its terminal to operate in one of modes on the basis of information input through operation of the input unit, information of the location of the vehicle acquired by the own-vehicle location acquisition unit, information of the route searched by the route searching unit, and a result of the processing performed by the cooperation processing unit, to thereby execute the function of the navigation device according to the mode, said modes including "an independent operation mode" in which the terminal itself operates independently, "a participatory cooperative operation mode" in which the terminal directly participates in an operation of the other terminal, and "a transitional cooperative operation mode" in which the terminal takes over information of the other terminal and performs an operation on the information followed by reflecting or not reflecting the information after that operation to the other terminal as information source; and a display unit that displays information of the navigation device resulted from the execution by the mode management unit.

3. The navigation device according to claim 2, wherein, when the route searched by the route searching unit is to be changed, the mode management unit makes a route control so that an extension in time can be achieved for judging whether or not to determine as a route for guidance, a route newly searched by the route searching unit.

* * * * *